Jan. 23, 1968    J. L. MOREN ET AL    3,365,698
AIRCRAFT LANDING SIGNAL DEVICE
Filed May 28, 1965    4 Sheets-Sheet 1
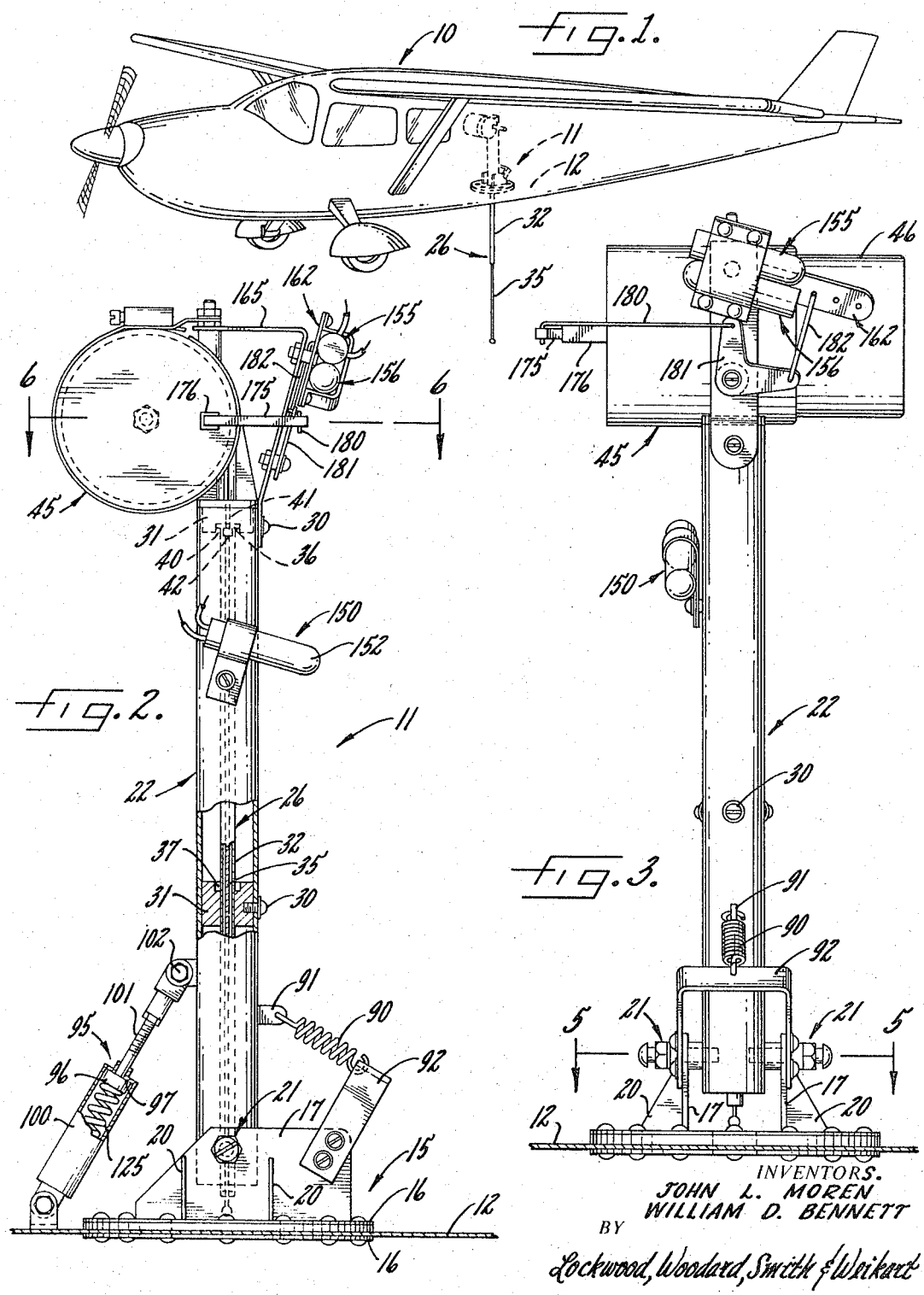
INVENTORS.
JOHN L. MOREN
WILLIAM D. BENNETT
BY
Lockwood, Woodard, Smith & Weikart
ATTORNEYS.

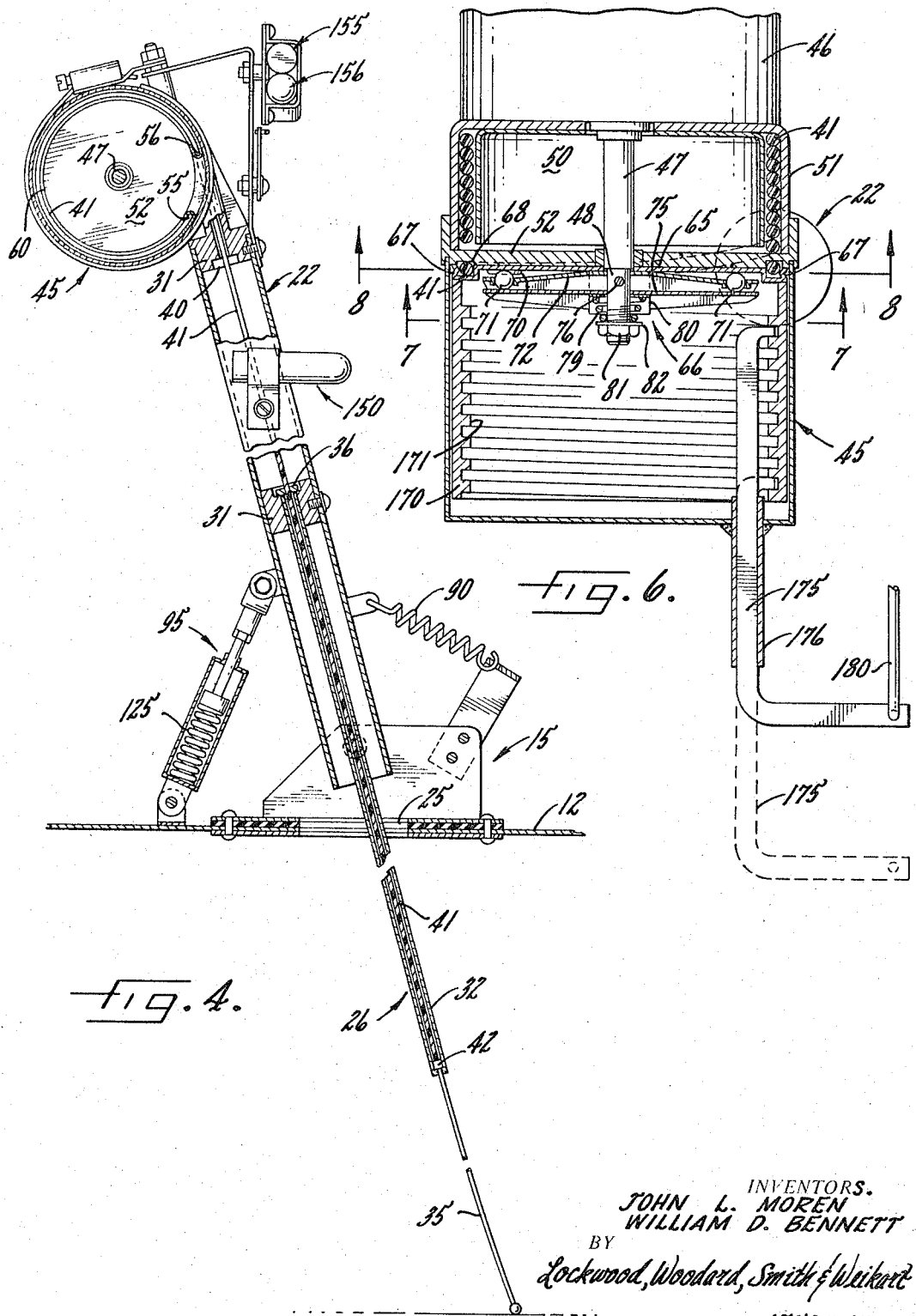

Jan. 23, 1968  J. L. MOREN ET AL  3,365,698
AIRCRAFT LANDING SIGNAL DEVICE
Filed May 28, 1965  4 Sheets-Sheet 4

INVENTORS.
JOHN L. MOREN
WILLIAM D. BENNETT
BY
Lockwood, Woodard, Smith & Weikart
ATTORNEYS.

United States Patent Office 3,365,698
Patented Jan. 23, 1968

3,365,698
AIRCRAFT LANDING SIGNAL DEVICE
John L. Moren, 1161 Ramsgate Court 46280, and William D. Bennett, R.R. 17, Box 286 46206, both of Indianapolis, Ind.
Filed May 28, 1965, Ser. No. 459,689
7 Claims. (Cl. 340—27)

ABSTRACT OF THE DISCLOSURE

An aircraft landing signal device including a housing pivotally mounted in upright position inside of the aircraft. A sensing element is telescoped within the housing and may be projected through the bottom wall of the aircraft. A mercury switch mounted on the housing energizes a buzzer when the housing is tilted by the sensing element engaging the ground.

---

The present invention relates to an aircraft landing signalling device.

One of the problems involved in operation of aircraft is landing at night and when visibility is poor. Various devices have been conceived for notifying a pilot that he is approaching and close to the ground. Some such devices use radio waves to guide the pilot in but are expensive and therefore are infrequently used on small aircraft. Other such devices have not proved to be completely satisfactory for various reasons.

It is, therefore, a primary object of the present invention to provide an improved aircraft landing signalling device.

Another object of this invention is to provide an aircraft landing signalling device which does not interfere with the aircraft operation during flight.

A further object of this invention is to provide an aircraft landing signalling device which can be easily installed in existing aircraft.

Still another object of this invention is to provide an inexpensive aircraft landing signalling device.

Related objects and advantages will become apparent as the description proceeds.

One embodiment of the present invention might include a housing adapted to be secured to the aircraft, a sensing element telescoped within said housing, means for projecting said sensing element from said housing to a point outboard of the aircraft and landing gear thereof and for retracting said sensing element to retelescoped position, and a signalling device arranged to be actuated by said sensing element engaging the earth.

The full nature of the invention will be understood from the accompanying drawings and the following description and claims.

FIG. 1 is a perspective view of an airplane having the aircraft landing signalling device of the present invention mounted thereon.

FIG. 2 is an enlarged side elevation partially in section of the landing signal device of the present invention.

FIG. 3 is a rear elevation of the structure illustrated in FIG. 2.

FIG. 4 is a side elevation similar to FIG. 2 but with greater portions of the apparatus shown in section.

FIG. 6 is a horizontal section taken along the line 6—6 of FIG. 2 in the direction of the arrows.

Figure 5:
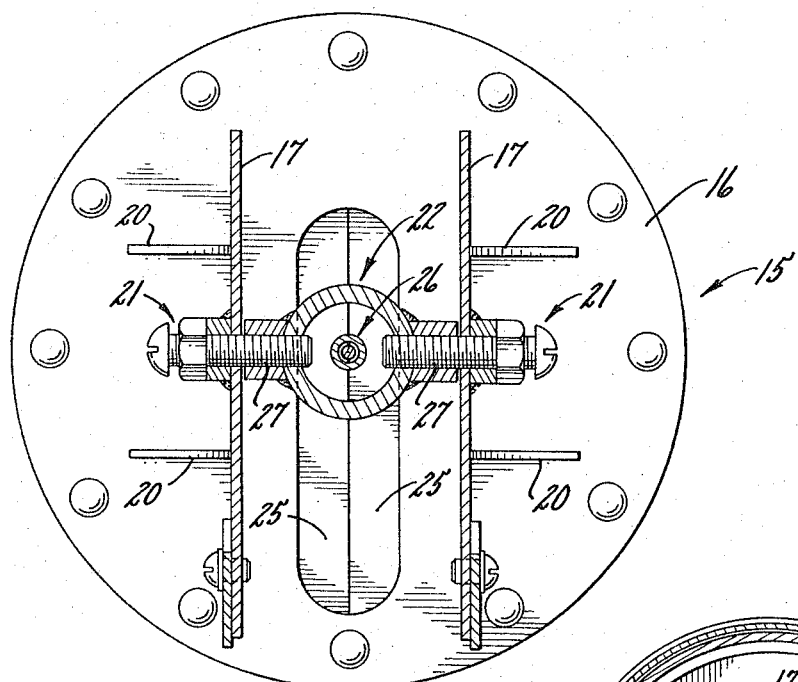
FIG. 5 is a horizontal section taken along the line 5—5 of FIG. 3 in the direction of the arrows.
Figure 7:
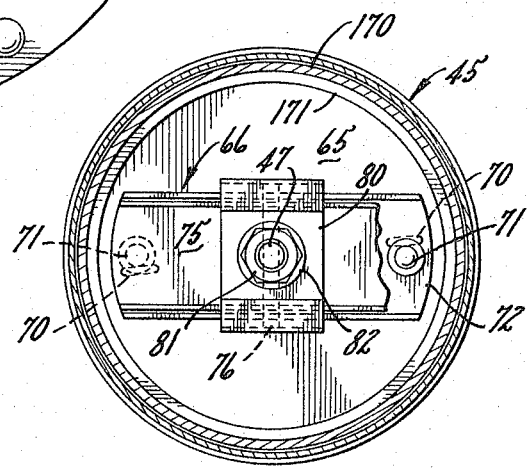
FIG. 7 is a section taken along the line 7—7 of FIG. 6 in the direction of the arrows.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated an aircraft 10 having a landing signalling device 11 mounted therewithin and upon the lower or bottom wall 12 of the aircraft. The device includes a base 15 incorporating plates 16 and a pair of upright support elements 17 and braces 20. Pivotally secured by suitable trunnion means 21 to the support elements 17 is an elongate tubular housing 22.

The base 15 is shown in some greater detail in FIG. 5 and additionally includes rubber lips 25 which are normally held in closed relation by their own resiliency. The lips 25, however, may be separated by and for the projection of a sensing element 26 normally housed in retracted position within the elongate housing 22.

Mounted within the elongate housing 22 by means of suitable set screws 30 are guide and stop elements 31. The sensing means 26 consists of a pair of telescoping members 32 and 35 with the member 35 being received within the member 32. The member 32 is received within suitable central apertures in the guides 31 whereby it is guided in its movement downwardly to a projected position beneath the aircraft as shown in FIG. 1. At the upper end of the hollow member 32 there is provided a stop 36 which engages the annular recess 37 in the lower member 31 to block further projection of the member 32. Upward travel of the member 32 is limited by the abutting of the flange 36 in the recess 40 in the upper guide member 31.

The sensing element 26 is projected by a nylon cord 41 which is secured to the inner telescoping member 35 at its upper end. When the nylon cord has projected the inner member 32 to its outermost position as illustrated in FIG. 4, the flanged end 42 of member 35 engages the inner distal end of the outer telescoping member 32 as shown in FIG. 4 projecting it until the flange 36 engages the lower stop 31.

Mounted at the upper end of the elongate housing 22 is a cylindrical housing 45 within which is housed a means for reeling and unreeling the nylon cord 41 for projecting and retracting the sensing element 26. This means includes an electric motor 46 having an output or driveshaft 47 upon which is rotatably mounted a reel 50. The nylon cord 41 is wound about the reel 50 and is retained within the portion 51 of the housing 45 when the sensing element is retracted. The housing portion 51 has a cup-shape end which is closed by a cover element 52, the forward face of which is best shown in FIG. 4. It can be seen that the cover 52 has a pair of holes or apertures 55 and 56 cast therein through which the nylon cord 41 is projected and extends. Thus, the nylon cord is coiled about the free rotatable reel member 50, extends through the aperture 55 in the cover 52 to the forward face of the cover, extends around a recess 60 in the forward face of the cover end then projects downwardly through the aperture 56 to its connection with the telescoping member 35 of the sensing means 26.

Figure 8:
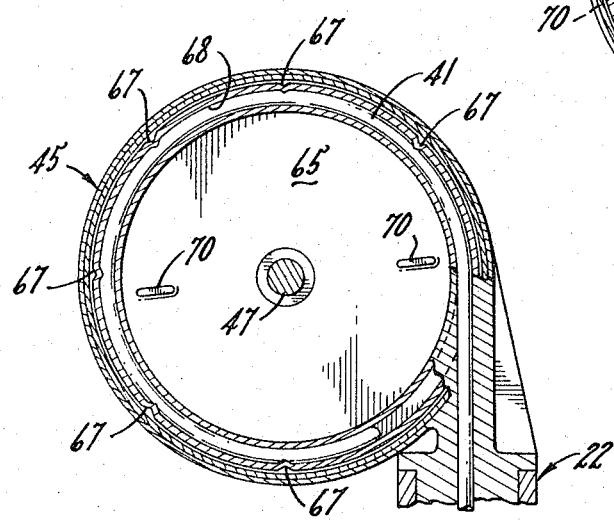
FIG. 8 is a section taken along the line 8—8 of FIG. 6 in the direction of the arrows.

The electrical motor 46 is reversible and can be operated to retract the sensing means or to project it as above described. The electrical motor 46 is coupled to a gripper member 65 by means of a slip coupling 66. The gripper member 65 is shown in FIG. 8 as having an annular recess 68 into which project drive protuberances 67 which engage the nylon cord 41 to rotate it with the gripper member 65. The gripper member 65 has two projections 70 on its forward face, said projections being engageable by a pair of balls 71 loosely received within a pair of suitable apertures in a retainer member 72. The retainer member 72 is fixed upon the reduced diameter portion 48 of the drive shaft 47 for rotation with the drive shaft by means of a pin 76. A pressure member 75 is cupped within the retainer member 72 and is held against the balls 71 by means of a spring 79 received between a nut and washer 81 and 82 and a yoke 80 which straddles members 72 and 75. It will be appreciated that the output shaft 47 drives the gripper member 65 through the retainer member 72 and the balls 71 which engage the projections 70. When the sensing means 26 reaches the lower end of its travel or the upper end of its travel, the spring 79 will back off and the balls 71 will slip past the projections 70 producing a clicking sound but preventing the motor 46 from being damaged by overheating and also preventing any damage to the sensing means by reason of excessive force being exerted thereon by the motor.

Figure 9:
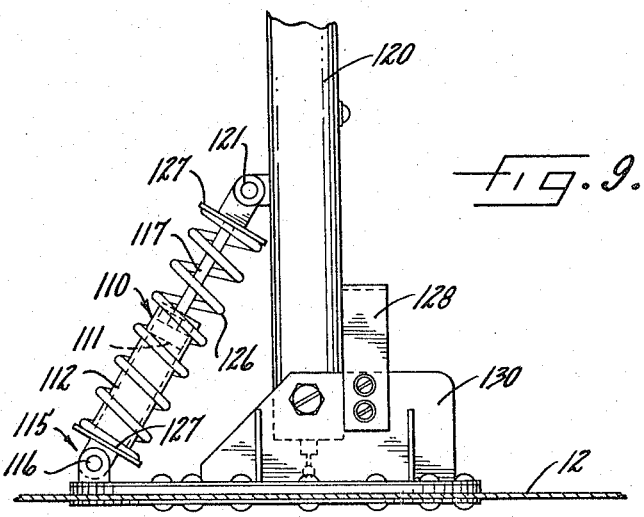
FIG. 9 is a fragmentary view similar to a portion of FIG. 2 of an alternative embodiment of the present invention.

The elongate housing 22 is normally held in an upright position as illustrated in FIG. 2 by means of the tension spring 90 which is secured at its ends to elongate housing element 91 and bracket 92, the element 91 being fixed to the housing 22 and the bracket 92 being fixed to the base 15. In the embodiment of FIG. 2 the elongate housing 22 is prevented from pivoting rearwardly of the aircraft past the upright illustrated position by means of a stop arrangement 95 including the piston 96 and the abutment surface 97 on the inside of a dashpot 100. The piston 96 has its piston rod 101 pivotally secured to the elongate housing 22 about the axis 102. The dashpot cylinder 100 is pivotally secured to either the base 15 or directly to the aircraft bottom wall 12 (as illustrated). An alternative arrangement to that illustrated in FIG. 2 is illustrated in FIG. 9 as including a dashpot 110 with a piston 111 operating therein. The cylinder 112 of the dashpot is pivoted to the base 115 at 116. The piston rod 117 is pivoted to the elongate housing 120 by suitable means 121. In the embodiment of FIG. 9 the spring 125 of FIG. 2 which operates within the cylinder 100 is replaced by the spring 126 which operates between two flat members 127 fixed to the cylinder 112 and the piston rod 117 respectively. Of course, the purpose of the springs 125 and 126 is to yieldably maintain or retain the elongate housing 120 upright.

The embodiment of FIG. 9 also incorporates a stop 128 fixed to the upright support elements 130 and operable similarly to the engagement of piston 96 and abutment 97 to block rearward movement of the elongate housing past the upright position illustrated in FIG. 9. In all other respects the embodiment of FIG. 9 is identical to the embodiment of FIG. 2.

Figure 10:
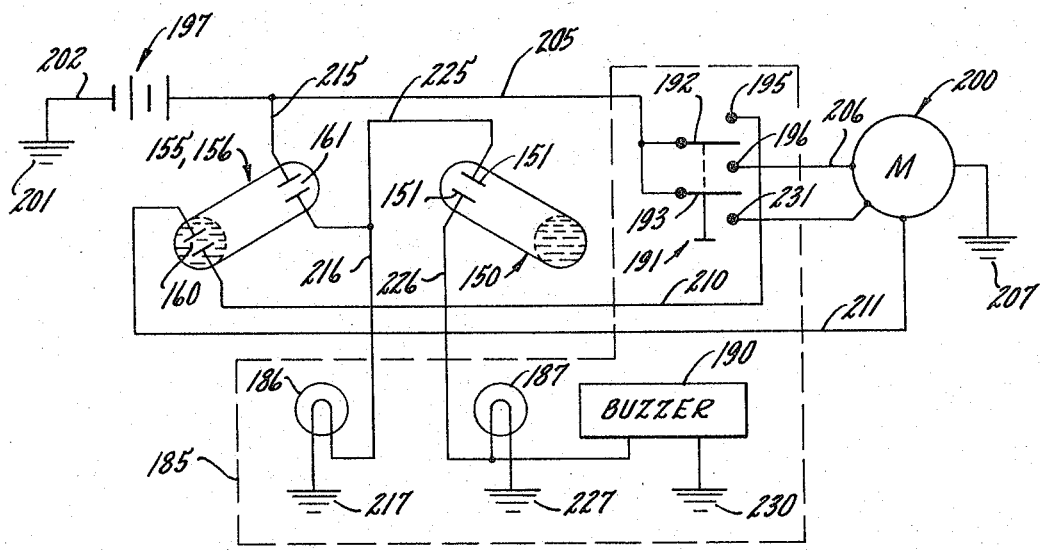
FIG. 10 is an electrical schematic diagram of the present apparatus.

Mounted upon the elongate housing 22 is a mercury switch 150 which is tilted as shown in FIG. 2 and FIG. 10 so that the contacts 151 of the switch are open when the elongate housing 22 is upright. The mercury switch 150 similarly to the other mercury switches of the present apparatus includes an elongate container 152 having mercury (not shown) therein, said mercury running to one end or the other end of the container depending upon the attitude thereof. When the elongated housing 22 is tilted or swung about the trunnion means 21 to the position illustrated in FIG. 4 and beyond, the contacts 151 of the switch are electrically connected. Also mounted upon the elongate housing 22 and at cylindrical housing 45 is a pair of switches 155 and 156. The pair of switches 155 and 156 may be separated as illustrated in FIG. 3 or may be combined as illustrated in FIG. 10 as a single switch with two sets of contacts 160 and 161. The switches 155 and 156 are mounted upon a carriage 162 which is pivotally secured to a bracket 165 fixed to the housings 22 and 45. The switches 155 and 156 may be moved between a first position in which the contacts 160 are electrically connected and the contacts 161 are electrically disconnected and a second position wherein the contacts 161 are electrically connected and the contacts 160 are electrically disconnected. When the switches 155 and 156 are in the position illustrated in FIG. 10, the sensing means 26 is retracted. When the sensing means is completely projected, the contacts 161 are electrically connected and the contacts 160 are electrically separated.

Fixed to the gripper member 65 is a cylinder 170 having internal threads 171. An actuating arm 175 is slidably mounted within the tube 176 fixed to the housing 45. The actuating arm 175 rides within the tube 176 and is projected in the position illustrated in dotted lines when the sensing means 26 is projected. The actuating arm 175 is retracted to the solid line position illustrated in FIG. 6 when the sensing means 26 is retracted. The actuating arm 175 is coupled to the carriage 162 for tilting the switches 155 and 156 by means of a link 180, an L-shaped lever 181, and a link 182 connected directly to the carriage 162.

The circuit of the present embodiment will now be described in connection with the operation of the present apparatus. In the cockpit of the aircraft there is mounted the various apparatus enclosed in dotted lines 185 of FIG. 10. Two signal lights 186 and 187, and a buzzer 190 as well as a switch 191 are mounted in the cockpit. The switch 191 is shown in the "off" position. Assuming that it is desired to use the present apparatus, the pilot moves the switch until the contacts 192 and 193 are engaging respectively the contacts 195 and 196. Thus, the battery or power source 197 energizes the field of the motor 200 through ground 201, the line 205, the contact 193, the contact 196, the line 206, the motor 200 and ground 207. The armature of the motor 200 is energized through ground 201, the line 202, battery 197, the line 205, contact 192, contact 195, the line 210, the contacts 160, the line 211, the motor 200 and the ground 207. Thus, the motor operates to rotate the drive member and to project the sensing means 26 as above described.

When the sensing means 26 reaches its lowermost position, the actuating arm 175 is projected and causes the switches 156 and 155 to be tilted from the position illustrated in FIG. 3 to a position where the contacts 161 are down and electrically connected and the contacts 160 are up and electrically disconnected. Thus the circuit through the contacts 160 to the motor 200 is disconnected and the motor stops. Also the light 186 is energized through ground 201, line 202, battery 197, the line 215, contacts 161, line 216, the light 186 and ground 217. The light 186 notifies the pilot that the aircraft landing signalling device of the present invention is projected and ready to indicate that the aircraft is aproaching the ground.

When the aircraft approaches the ground sufficiently close that the sensing device 26 engages the ground, the elongate housing 22 is swung forwardly because the sensing means 26 is swung rearwardly all against the urging of the springs 90 and 125. Movement to the position of FIG. 4 of this structure causes the contacts 151 of the switch 150 to be electrically connected energizing the light 187 and causing the buzzer 190 to buzz thus notifying the pilot that the aircraft is nearing the ground. The light 187 and buzzer 190 are energized through the ground 201, line 202, battery 197, line 215, contacts 161, line 225, contacts 151, line 226, and parallel connected light 187 and buzzer 190 to ground 227 and 230.

After the plane has landed, the pilot pushes the switch 191 to a downward position as illustrated in FIG. 10 causing the contacts 192 and 193 to engage the contacts 196 and 231 respectively. Such operation of the switch 191 causes the motor 200 to operate to raise the sensing means 26 by reversing the current to the armature of the motor. Thus, the present apparatus moves to a position wherein the sensing means 26 is retracted, the contacts 161 are open, the contacts 160 are closed, and the contacts 151 are open. Thus, even though the elongate housing 22 might be pivoted for some reason to the position of FIG. 4, the buzzer 190 and signal light 187 will not be energized. Also the light 186 will be de-energized notifying the pilot that the sensing element 26 is retracted.

It will be evident from the above description that the present invention provides an improved aircraft landing signaling device. It will also be evident from the above description that the aircraft signalling device of the present invention does not interfere with aircraft operation during flight because the sensing means 26 is retracted. It will also be evident that the aircraft landing signalling device of the present invention is inexpensive and easily installed in existing aircraft.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An aircraft landing signal device comprising a housing adapted to be secured to the aircraft inside the aircraft above the bottom wall thereof, a sensing element telescoped within said housing, means for projecting said sensing element downwardly from said housing through the bottom wall of the aircraft to a point outboard of the aircraft and landing gear thereof and for retracting said sensing element to retelescoped position inside the aircraft above the bottom wall thereof, and a signalling device arranged to be actuated by said sensing element engaging the earth and being forced rearwardly of the aircraft.

2. An aircraft landing signal device comprising a base adapted to be secured to the aircraft inside the aircraft above the bottom wall thereof, an elongate housing pivoted to said base and mounted thereon so as to extend upwardly therefrom inside the aircraft, an elongate sensing element telescoped within said housing, means for projecting said sensing element downwardly from said housing through said bottom wall to a point outboard of the aircraft and landing gear thereof and for retracting said sensing element to retelescoped position inside said housing, and a signalling device arranged to be actuated by the pivoting of said sensing element and housing on said base.

3. In an aircraft landing signal device, a base secured to the bottom wall of the aircraft, an elongate housing within said aircraft and pivoted at a proximal end thereof to said base for swinging movement about a horizontal axis transverse of the aircraft, an elongate sensing element telescoped within said housing, means for projecting said sensing element through said bottom wall from said housing to a point outboard of the aircraft and landing gear thereof and for retracting said sensing element to retelescoped position within said housing, stop means limiting the rearward pivoting of said housing beyond an upright position, spring means yieldably holding said housing in said upright position, and signalling means actuated by the forward pivoting of said housing.

4. In an aircraft landing signal device, a base secured to the bottom wall of the aircraft, an elongate housing within said aircraft and pivoted at a proximal end thereof to said base for swinging movement about a horizontal axis transverse of the aircraft, an elongate sensing element telescoped within said housing, means for projecting said sensing element from said housing to a point outboard of the aircraft and landing gear thereof and for retracting said sensing element to retelescoped position within said housing, stop means limiting the rearward pivoting of said housing beyond an upright position, spring means yieldably holding said housing in said upright position, and signalling means actuated by the forward pivoting of said housing, said signalling means comprising a buzzer and a light, a power source, a mercury switch mounted on said elongate housing, circuit means connecting said mercury switch, power source, and said buzzer and light, said mercury switch including contacts which are closed to energize said buzzer and light by said housing pivoting forwardly.

5. In an aircraft landing signal device, a base secured to the bottom wall of the aircraft, an elongate housing within said aircraft and pivoted at a proximal end thereof to said base for swinging movement about a horizontal axis transverse of the aircraft, an elongate sensing element telescoped within said housing, means for projecting said sensing element from said housing to a point outboard of the aircraft and landing gear thereof and for retracting said sensing element to retelescoped position within said housing, stop means limiting the rearward pivoting of said housing beyond an upright position, spring means yieldably holding said housing in said upright position, and signalling means actuated by the forward pivoting of said housing, said housing being tubular, said projecting means including a reversible electrical motor, an output shaft for said motor, a reel rotatably received on said shaft, a flexible cord coiled on said reel, a gripper element rotatably mounted on the distal end of said output shaft and including inwardly directed teeth adapted to engage said cord and force it into said tubular housing for projecting said sensing element, a retainer member secured to the distal end of said shaft for rotation therewith, balls between said gripper element and said retainer member, spring means urging said balls toward said gripper element and causing said balls to rotate said gripper element until said sensing element is projected whereupon said balls permit slipping between said retainer member and gripper element.

6. The device of claim 5 wherein said sensing element includes at least two telescoping members, said flexible cord being fixed to said one member and extending through the hollow portion of said other member.

7. The device of claim 6 additionally comprises a cylindrical housing; said reel, gripper element and driver member being contained within said cylindrical housing; an actuating arm movably mounted on said cylindrical housing; an internally threaded member fixed to said gripper member and rotatable therewith; said actuating arm being engaged with the internal threads of said internally threaded member and movable to a first position when said sensing element is projected and a second position when said sensing element is retracted, switch means mounted on said tubular housing, said switch means being arranged to condition said signalling means for operation only when said arm is in said first position and not when said arm is in said second position.

References Cited

UNITED STATES PATENTS 2,710,389    6/1955    Bayne _____ 340—27

THOMAS B. HABECKER, *Acting Primary Examiner.*

NEIL C. READ, *Examiner.*

A. H. WARING, *Assistant Examiner.*